July 31, 1962 L. N. LIEBERMANN 3,046,780
HYDROPHONE FLUID CONDITION MONITOR
Filed June 30, 1959 2 Sheets-Sheet 2

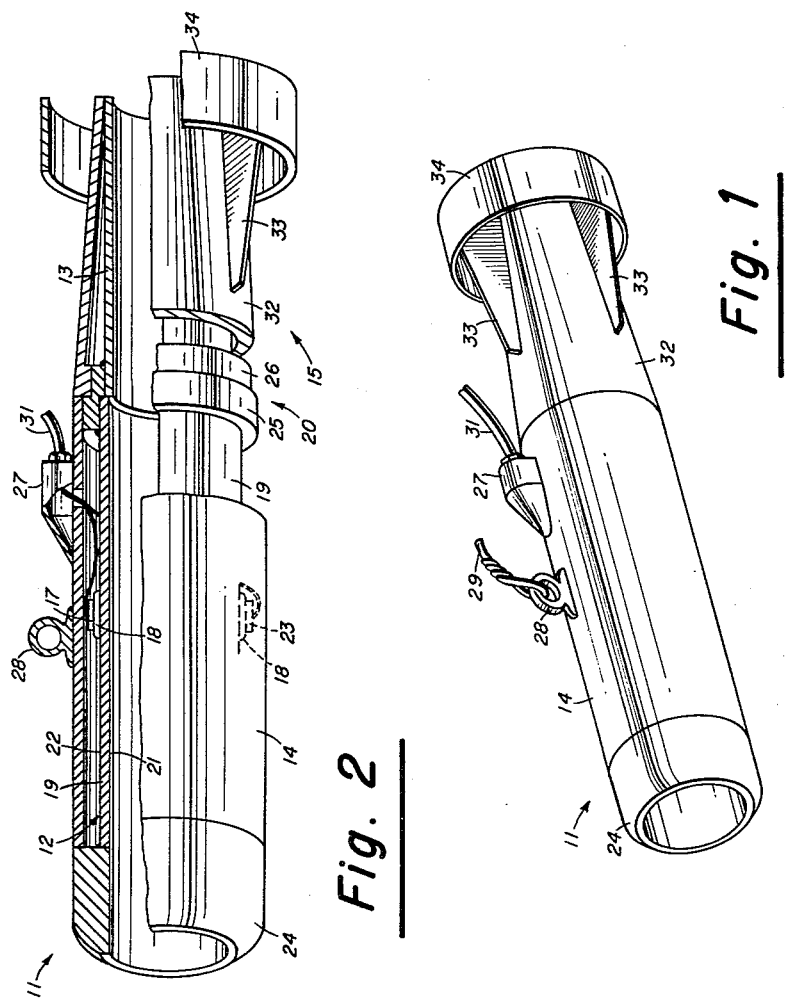

INVENTOR.
LEONARD N. LIEBERMANN
BY
ATTORNEYS

United States Patent Office 3,046,780
Patented July 31, 1962

3,046,780
HYDROPHONE FLUID CONDITION MONITOR
Leonard N. Liebermann, San Diego, Calif., assignor, by mesne assignments, to the United States of America as represented by the Secretary of the Navy
Filed June 30, 1959, Ser. No. 824,140
17 Claims. (Cl. 73—53)

This invention relates broadly to a fluid condition monitor and more particularly to a fluid condition monitor utilizing an acoustic resonator in which the physical disturbances or impurities of a fluid within an acoustic resonator are determined by measuring the Q of the resonator.

The need for a simple automatic means for determing the impurity content or relative turbulence of a fluid medium has long been felt. In the past this need has been supplied by the use of flow meters and chemical analysis. Flow meters, of course, merely indicate the velocity of the medium and chemical analysis has many inherent disadvantages, the more glaring of which are the time element, random sampling as opposed to a constant dynamic test, and the expense and complications involved.

According to the invention, the fluid under test or observation is passed through a cylinder which has an acoustical resonance at a predetermined frequency and harmonics thereof. Mounted diameterically opposed on the cylinder are two electrical transducers. The electrical output of one transducer is amplified and this amplified output drives the other transducer. The other transducer then acoustically excites the cylinder, which will ring at its natural resonant frequency. This ringing will further excite the first transducer completing an oscillatory cycle. The strength of oscillations will be directly proportional to the acoustical Q of the cylinder, which, in turn, is inversely proportional to the amount of impurities and/or disturbances, such as bubbles, present in the fluid. Thus, by simply metering the strength of oscillation, a reliable and constant indication is given of the relative purity and presence or lack of turbulence in the fluid. This has the obvious advantages of providing in situ a monitor of the instantaneous condition of the fluid under observation.

It is thus an object of the present invention to provide a simple, inexpensive fluid condition monitoring means.

Another object is the provision of a fluid condition monitoring means which gives a continuous, instantaneous indication.

A further object of the invention is to provide a fluid condition monitoring means which can be utilized in situ.

Other objects and many of the attendant advantages of the invention will be readily appreciated as the same becomes better understood by reference to the following detailed description when considered in connection with the accompanying drawings wherein:

FIG. 1 is an isometric view of the apparatus completely assembled;

FIG. 2 is an isometric view of the resonator chamber with its constriction tube and showing the position of one of the crystals on the resonator chamber;

Figure 4:
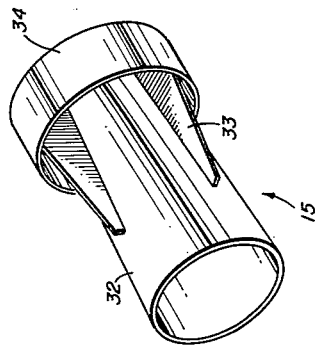
FIG. 4 is an isometric view of the tail assembly.

FIG. 1 is an illustration of the assembled acoustic resonator or hydrophone 11. As can readily be seen, hydrophone 11 is constructed of four main parts; a resonant chamber 12, a constriction tube 13, an outer shell 14, and a tail assembly 15. Resonant chamber 12 and constriction tube 13 are assembled end to end through a ring 20 to form an integral hollow cylinder. Outer shell 14 is slidably fitted onto resonant chamber 12 and tail assembly 15 is slidably fitted on constriction tube 13 abutting an end of outer shell 14. All four main parts of the resonator are constructed of rolled brass tubing to eliminate as much machine work as possible. As a result, the tolerances for fitting the four main parts together are permitted to be relatively large.

Resonator chamber 12 as shown in FIG. 2 comprises a hollow cylinder 19, preferably made of rolled brass tubing, and having an inner wall 21 and an outer wall 22. A pair of barium titanate crystals 23 and 17 are mounted on rubber pads 18 on the outer wall 22 of the resonator chamber 12 in diameterically opposed positions.

The driving crystal 23 and the monitoring crystal 17 are identical structures. Said crystals are fixed to rubber mounts 18 designed to transmit compressional vibrations and to reject shear oscillations which are readily propagated in inner wall 21 of resonator chamber 12.

When the column of water passes through resonator chamber 12, the system is capable of oscillating in a high Q mode. It is absolutely necessary that the inner wall 21 of the chamber, which is exposed to sea water, be chemically clean to ensure perfect wetting of inner wall 21, because even a microscopic contamination of the wall will result in an appreciable lowering of the Q of the resonator, and hence of loss of detection sensitivity.

Hollow cylinder 19 has a nose piece 24 fitted on the end of resonator chamber 12 and is soldered thereto. Nose piece 24 is designed to suppress cavitation when hydrophone 11 is towed through the water, and inner wall 21 of resonator chamber 12 is completely wetted by sea water passing therethrough.

Ring 20 is an integral structure composed of two rings 25, 26 positioned adjacent one another. Larger ring 25 has a greater outside and inside diameter than inner ring 26. The inside diameter of larger ring 25 slidably fits over the end of resonator chamber 12 opposite the end of the chamber containing nose piece 24. The inside diameter of smaller ring 26 slidably receives one end of constriction tube 13. Ring 25 is soldered to resonant chamber 12 and ring 26 is soldered to constriction tube 13.

As shown in FIG. 2, the outer shell 14 is positioned over resonant chamber 12 and engages ring 25. Tail assembly 15 is positioned over constriction tube 13, and engages ring 26.

Figure 3:
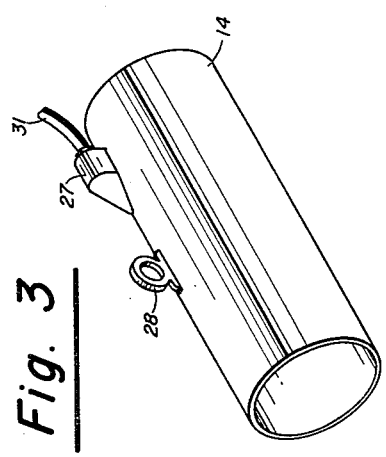
FIG. 3 is an isometric view of the outside shell.

As illustrated in FIG. 3, outer shell 14 is a hollow cylinder, with an inner diameter slightly larger than the diameter of resonant chamber 12. On the outside surface of outer shell 14, a cable housing 27 is welded thereon just forward of the end which is fitted over larger ring 25. Also, mounted on the outside surface of outer shell 14 is towing lug 28 to which a cable 29 can be attached for towing the assembled hydrophone 11. As previously mentioned, because the inner diameter of outer shell 14 is slightly larger than the outside diameter of resonant chamber 12, an air space is formed between outer shell 14 and resonant chamber 12 which air space performs important functions in the acoustical design of the resonator. Attached to crystals 17 and 23 is cable 31 which is led out of the air space between outer shell 14 and chamber 12 through cable housing 27 to the indicator amplifier shown in FIG. 5.

Contriction tube 13 is slightly smaller in diameter than the inner diameter of resonator chamber 12. One end is slidably fitted within the inner diameter of smaller ring 26 and soldered thereto. The main purpose of constriction tube 13 being smaller in diameter than resonator chamber 12 is to provide a slight increase in static pressure within resonator chamber 12 which lessens the likelihood of cavitation at higher towing speeds.

Tail assembly 15, as shown in FIG. 4, comprises a tapered funnel 32. At the smaller end of funnel 32, there are welded thereto four fins 33. A large stabilizing ring 34 is positioned and welded on to fins 33 whereby one end of ring 34 is in radial alignment with the rim of the smaller end of funnel 32. Tail assembly 15 is fitted concentrically on constriction tube 13 and welded in place.

Figure 5:
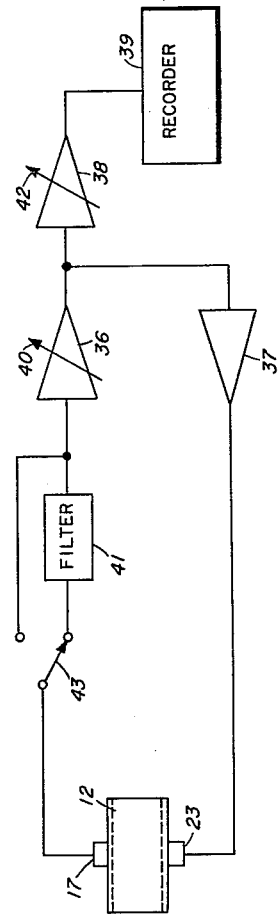
FIG. 5 is a schematic circuit diagram of the indicator amplifier employed in conjunction with the acoustic resonator.

Referring to FIG. 5, the electronic system will now be considered. The electronic system generally comprises a receiver amplifier 36, a driver amplifier 37 and a recorder amplifier 38. The function of receiver 36 is to amplify the signal generated in monitoring crystal 17. The signal from receiver amplifier 36 is sent through driver amplifier 37 to driving crystal 23 which completes the regeneration circuit. The received signal is also sent to recorder amplifier 38 where it is rectified and amplified and from here the received signal passes to recorder 39 where it is metered and/or recorded.

It is desired during operation of hydrophone 11 to keep input sound intensity constant. With this purpose in mind, driver amplifier 37 is operated at saturation. Here this result is accomplished by having the driver amplifier 37 saturate at approximately 10 volts which is considerably lower than the output voltage of receiver amplifier 36. In this manner the receiving amplifier voltage remains directly proportional to the Q of acoustic resonator or hydrophone 11 and hence inversely proportional to the amount of disturbances and impurities in the medium, while the voltage of the driving crystal 23 remains essentially independent of the amount of impurities and disturbances in the medium. It can readily be appreciated that upon large signals being received, i.e., heavy disturbances and/or large amounts of impurities, the system may drop out of oscillation because of the resultant lowering of the Q, but will resume oscillation when the disturbance has passed. In order to observe the oscillations of the received signals, a meter (not shown) is connected across the output of receiver 36 to serve as an oscillation indicator. Receiver amplifier 36 is optionally operated at near-saturation. Because of this near-saturation operation of receiver amplifier 36, the meter will rarely fluctuate except in the event of strong signals.

Receiving amplifier 36 is equipped in the preferred embodiment with a low pass filter 41 and cutout switch 43 whose function is to select a mode of oscillation in the low frequency region of approximately 70 kc., as without filter 41 the natural mode of oscillation is approximately an octave higher, that is, 140 kc. Recorder amplifier 38 consists preferably of a voltage doubler for detecting the envelope of the oscillation signal and a very low frequency amplifier. Recorder amplifier 38 is also preferably designed to give considerably more weight to a signal consisting of a series of relatively small pulses rather than a single large pulse as such a circuit takes advantage of the statistical quality of a weak signal. Further, a carefully regulated power supply is utilized to eliminate possible difficulties arising from poor regulation of a primary power supply. Since all of these electronic components are well known and conventional a detailed circuit analysis is deemed unnecessary.

It is desired during employment of acoustic resonator or hydrophone 11 on shipboard installations, to conveniently locate the assembled unit at an optimum point, preferably between a ship's bow and its amidships on a horizontal boom sufficiently outboard of the ship's bow wave. It is pointed out, however, that the resonator is not limited to a surface ship, and can be employed on submersibles or even in pipelines to detect impurities or disturbances in a fluid medium. The illustrated unit is designed to work with a 100 feet of electric cable 31. The maximum amount of cable that can be employed is limited by its capacitance which acts as a shunt across the piezoelectric crystals 17 and 23 and must be contemplated when determining what length of electric cable to use. Since the steel towing cable 29 and electrical cable 31 are normally taped together, the towing stress of hydrophone 11 is communicated to the steel wire and not the electrical cable 31.

Hydrophone or resonant chamber 11, when being used, is placed in water and the regeneration control 40 (the gain control of receiver 36) is gradually increased until the circuit breaks into oscillation as indicated by the output meter on the front panel (not shown). It should be mentioned that this point is usually the proper setting for the regeneration control 40. This is important in the operation of the apparatus. A further increase in regeneration may produce saturation of receiver amplifier 36 with undesirable effect on the sensitivity range of the fluid monitor apparatus. On the other hand, too little regeneration is also to be avoided since it renders the circuit somewhat unstable. It is considered a good check for optimum regeneration to slightly increase or decrease the regeneration setting whereby the output meter will likewise slightly increase or decrease. Care should be given to its proper setting because once set it rarely needs to be readjusted.

The gain control 42 merely controls the gain of the recording amplifier 38. Its setting is dependent upon the background noise level arising from local oceanographic conditions. It should be mentioned that this setting should be as high as is tolerable compatible with the background level. Though preliminary tests indicate that the 70 kc. frequency gives better results, both frequencies should be tested by throwing the switch 45 to short the low pass filter 41 and thereby increase the natural frequency to 140 kc.

Obviously many modifications and variations of the present invention are possible in the light of the above teachings. It is therefore to be understood that within the scope of the appended claims the invention may be practiced otherwise than as specifically described.

What is claimed is:

1. An acoustic resonator adapted to be immersed in and towed through a fluid medium, said resonator being adapted to readily pass fluid therethrough as it is towed through the fluid medium, comprising an open-ended hollow longitudinally-disposed tubular member whose inner surface is to be acoustically exposed to the given fluid medium and which has an open fluid-entry end and an open fluid-exit end, the fluid-exit end of said tubular member being of smaller inside diameter than the fluid-entry end of said tubular member to define a constriction means at the fluid-exit end of said tubular member for reducing the likelihood of cavitation in the fluid medium when said acoustic resonator is being towed at high speeds; envelope means disposed outwardly of said tubular member in encompassing position therearound and defining with the outer surface of said tubular member an annularly-disposed cavity between said tubular member and said envelope means; and at least one electromechanical converter means disposed within said cavity and in vibration-transmitting relationship with the outer longitudinally-extending surface of said tubular member, said electromechanical converter means being adapted to connect to an externally-leading electrical lead.

2. An acoustic resonator adapted to be immersed in and towed through a fluid medium, said resonator being adapted to readily pass fluid therethrough as it is towed through the fluid medium, comprising an open-ended hollow longitudinally-disposed tubular member whose inner surface is to be accoustically exposed to the given fluid medium and which has an open fluid-entry end and an open fluid-exit end, the fluid-exit end of said tubular member being of smaller inside diameter than the fluid-entry end of said tubular member to define a constriction means at the fluid-exit end of said tubular member for reducing the likelihood of cavitation in the fluid medium when said acoustic resonator is being towed at high speeds; envelope means disposed outwardly of said tubular member in encompassing position therearound and defining with the outer surface of said tubular member an annularly-disposed cavity between said tubular member and said envelope means; a first electromechanical converter means disposed within said cavity and in vibration-transmitting relationship with the outer longitudinally-extending surface of said tubular member, said first electromechanical converter means being adapted to connect to an electrical lead; and a second electromechanical converter means disposed in said cavity and in vibration-transmitting relationship with the outer longitudinally-extending surface of said tubular member, said second electromechanical converter means also being adapted to connect to an electrical lead.

3. The resonator of claim 2 wherein said first and said second electromechanical converter means are located substantially diametrically opposite one another.

4. The resonator of claim 3 wherein said first and said second electromechanical converter means comprise barium titanate crystals.

5. The resonator of claim 3 further defined by means disposed outwardly of said tubular member at the fluid-exit end thereof for stabilizing the attitude of said resonator as it is being towed through the fluid medium.

6. The resonator of claim 3 wherein said tubular member is formed at its fluid-entry end with a curved surface for suppressing cavitation in the fluid passing into said tubular member via the fluid-entry end thereof.

7. The resonator of claim 4 wherein said envelope means has an outer surface which is streamlined.

8. An acoustic resonator adapted to be immersed in and towed through a fluid medium, said resonator being adapted to readily pass fluid therethrough as it is towed through said fluid medium, comprising an open-ended hollow longitudinally-extending tubular member whose inner surface is to be acoustically exposed to the given fluid medium and which has an open fluid-entry end and an open fluid-exit end; a pair of electro-mechanical converter means disposed in vibration-transmitting relationship with the outer longitudinally-extending surface of said tubular member, one of said electromechanical converter means serving as an energy transmitting element and the other of said electromechanical converter means serving as an energy receiving element, each of said electromechanical converter means being adapted to connect to an electrical line; and streamlined envelope means disposed outwardly of said tubular member and outwardly of said pair of electromechanical converter means and connected to said tubular member for forming with the outer surface of said tubular member a cavity which is insulated from the fluid medium and is concentrically disposed about said tubular member, said pair of electromechanical converter means being located in said cavity.

9. The resonator of claim 8 further defined by means connected to the exit-end of said tubular member for reducing the likelihood of cavitation in the fluid medium when said acoustic resonator is being towed at high speeds.

10. The resonator of claim 9 wherein said means for reducing the likelihood of cavitation in the fluid medium consists of a fluid-passage-constriction means for inducing a slight increase in static pressure in the fluid passing through said tubular member.

11. The resonator of claim 9 further defined by stabilizing means, connected to the exit-end of said tubular member, for stabilizing the attitude of said resonator as it is being towed through the fluid medium.

12. The resonator of claim 11 wherein said stabilizing means is disposed outwardly of said cavitation-reducing means.

13. The resonator of claim 12 wherein said electromechanical converter means comprise barium titanate crystals.

14. The resonator of claim 13 further defined by a lug means connected to said envelope means, said lug means being adapted to connect to a towing cable for enabling towing of said resonator through the fluid medium.

15. The resonator of claim 12 wherein the fluid-entry end of said tubular member and the adjacent portion of said envelope means present a streamlined contour at the fluid-entrance end of said resonator for suppressing cavitation as said resonator is towed through the fluid medium.

16. The resonator of claim 13 further defined by means connected to each of said barium titanate crystals for permitting compressional vibrations to be transmitted between said barium titanate crystals and said tubular member but blocking the transmission between said tubular member and said barium titanate crystals of shear vibrations.

17. Apparatus for measuring the amount of impurities and turbulence in a fluid medium comprising an open-ended hollow longitudinally disposed acoustic resonator chamber adapted to be immersed in and towed through the given fluid medium and to readily pass fluid therethrough, said chamber having a fluid-entry end and a fluid-exit end, said chamber being formed at its fluid-entry end with a contour for suppressing cavitation which might be initiated by the towed movement of said chamber through the fluid medium; constriction means connected to the fluid-exit end of said chamber for yielding a slight increase in static pressure of the fluid within said chamber for the like purpose of suppressing cavitation; stabilizing means connected to the fluid-exit end of said chamber for stabilizing the attitude of said chamber as it is being towed through the fluid medium; a pair of electro-mechanical converter means disposed in vibration-transmitting relationship with said chamber, one of said electromechanical converter means acting as an energy transmitting element and the other of said electromechanical converter means acting as an energy receiving element; a regenerative feedback circuit interconnecting each of said electromechanical converter means for setting said chamber into resonant oscillation; electrical signal amplitude indicating means connected to said regenerative feedback circuit for continuously indicating the variation in Q in said chamber, the instant Q indication serving as a measure of the impurity content and amount of turbulence in the fluid concurrently within said chamber; and means connected to said chamber for permitting it to be towed through the fluid medium.

References Cited in the file of this patent
UNITED STATES PATENTS

| | | |
|---|---|---|
| 1,570,781 | Ruben | Jan. 26, 1926 |
| 1,708,487 | Robbins | Apr. 9, 1929 |
| 2,283,750 | Mikelson | May 19, 1942 |
| 2,756,404 | Anderson et al. | July 24, 1956 |
| 2,785,567 | Poole et al. | Mar. 19, 1957 |
| 2,839,915 | Roth et al. | June 24, 1958 |
| 2,869,357 | Kritz | Jan. 20, 1959 |
| 2,943,476 | Bernstein | July 5, 1960 |

FOREIGN PATENTS

| | | |
|---|---|---|
| 574,819 | Great Britain | Jan. 22, 1946 |